(12) United States Patent
Kleemann

(10) Patent No.: US 6,550,848 B2
(45) Date of Patent: Apr. 22, 2003

(54) SLIDING DOOR FOR A MOTOR VEHICLE

(75) Inventor: Klaus Kleemann, Birkenfeld (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/951,752

(22) Filed: Sep. 14, 2001

(65) Prior Publication Data

US 2002/0036415 A1 Mar. 28, 2002

(30) Foreign Application Priority Data

Sep. 15, 2000 (DE) ......................... 100 45 589

(51) Int. Cl.⁷ .................................. B60J 5/06
(52) U.S. Cl. ................ 296/155; 296/189; 49/141; 49/360; 16/87.4 R; 16/94 R; 16/96 R
(58) Field of Search ................ 296/155, 189; 49/141, 360; 16/87.4 R, 94 R, 96 R

(56) References Cited

U.S. PATENT DOCUMENTS

| 3,605,338 A | | 9/1971 | Grossbach | ................. 49/212 |
|---|---|---|---|---|
| 4,152,872 A | * | 5/1979 | Tanizaki et al. | ............. 296/155 |
| 4,413,444 A | * | 11/1983 | Chikaraishi | .................. 296/155 |
| 4,703,585 A | | 11/1987 | Koch | ............................ 49/223 |
| 5,676,417 A | * | 10/1997 | Olivier | ........................ 296/155 |
| 5,992,919 A | * | 11/1999 | Menke | ......................... 296/155 |
| 6,089,649 A | * | 7/2000 | Hamada et al. | .............. 296/155 |
| 6,231,113 B1 | * | 5/2001 | Armbruster et al. | ......... 296/155 |
| 6,270,149 B1 | * | 8/2001 | Fukumoto et al. | ........... 296/155 |

FOREIGN PATENT DOCUMENTS

| DE | 1780577 | 10/1975 |
|---|---|---|
| DE | 3414890 | 4/1984 |

* cited by examiner

Primary Examiner—D. Glenn Dayoan
Assistant Examiner—Lori L Coletta
(74) Attorney, Agent, or Firm—Crowell & Moring LLP

(57) ABSTRACT

A sliding door is arranged on a side wall of a body of a motor vehicle. A running device interacts with a guide rail mounted on the side wall. A safety device is provided for aiding in opening of the sliding door after an accident-caused deformation of the vehicle body. In order to achieve an good functioning of the safety device, it is constructed in such a fashion that, after a deformation affecting the side wall, a movement of the running device in the guide rail can be implemented for opening the sliding door.

17 Claims, 3 Drawing Sheets

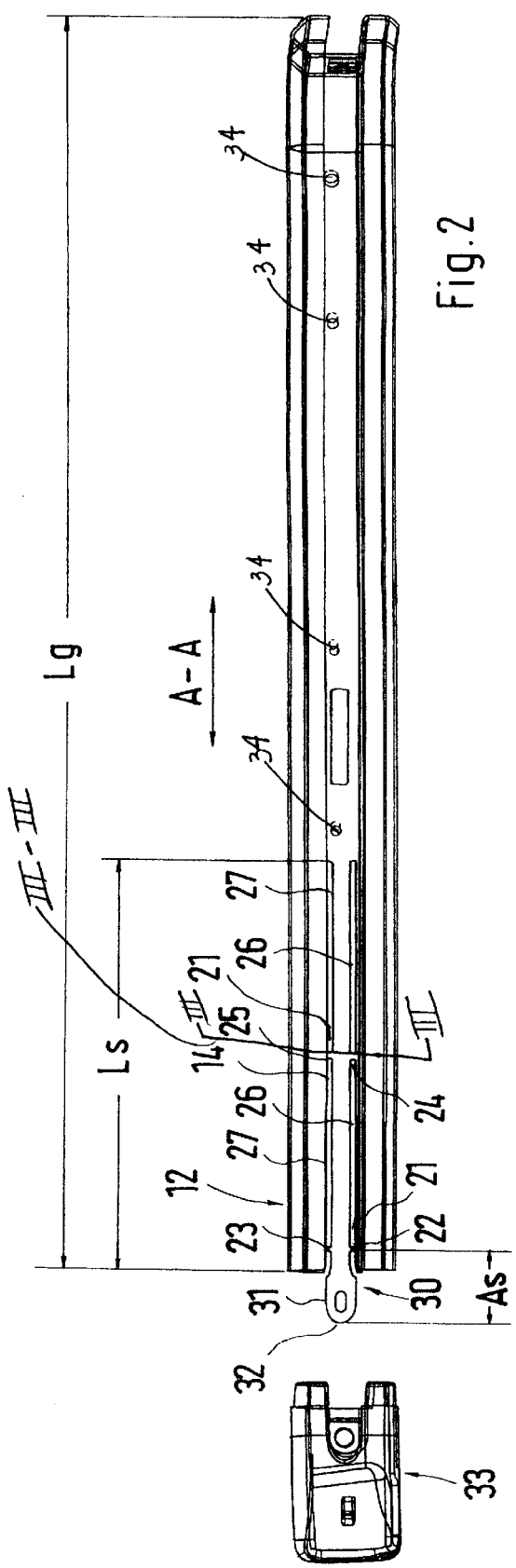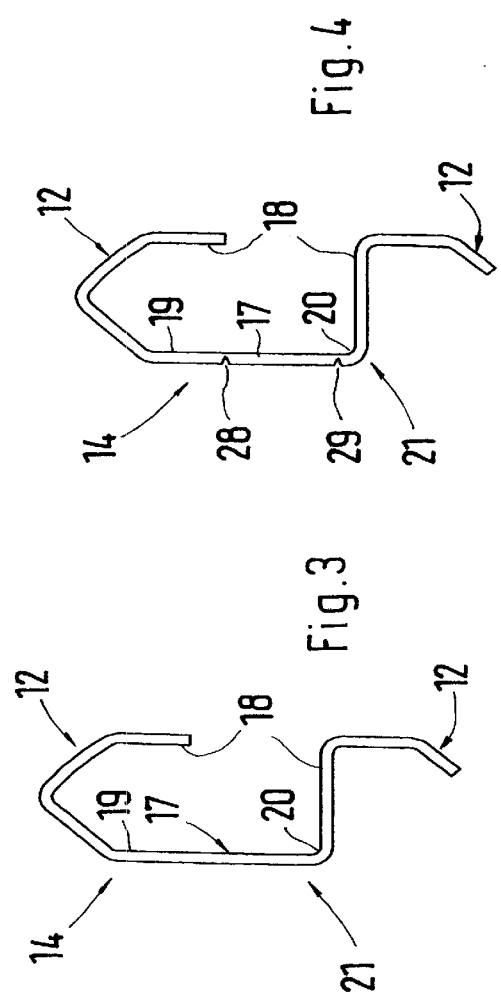

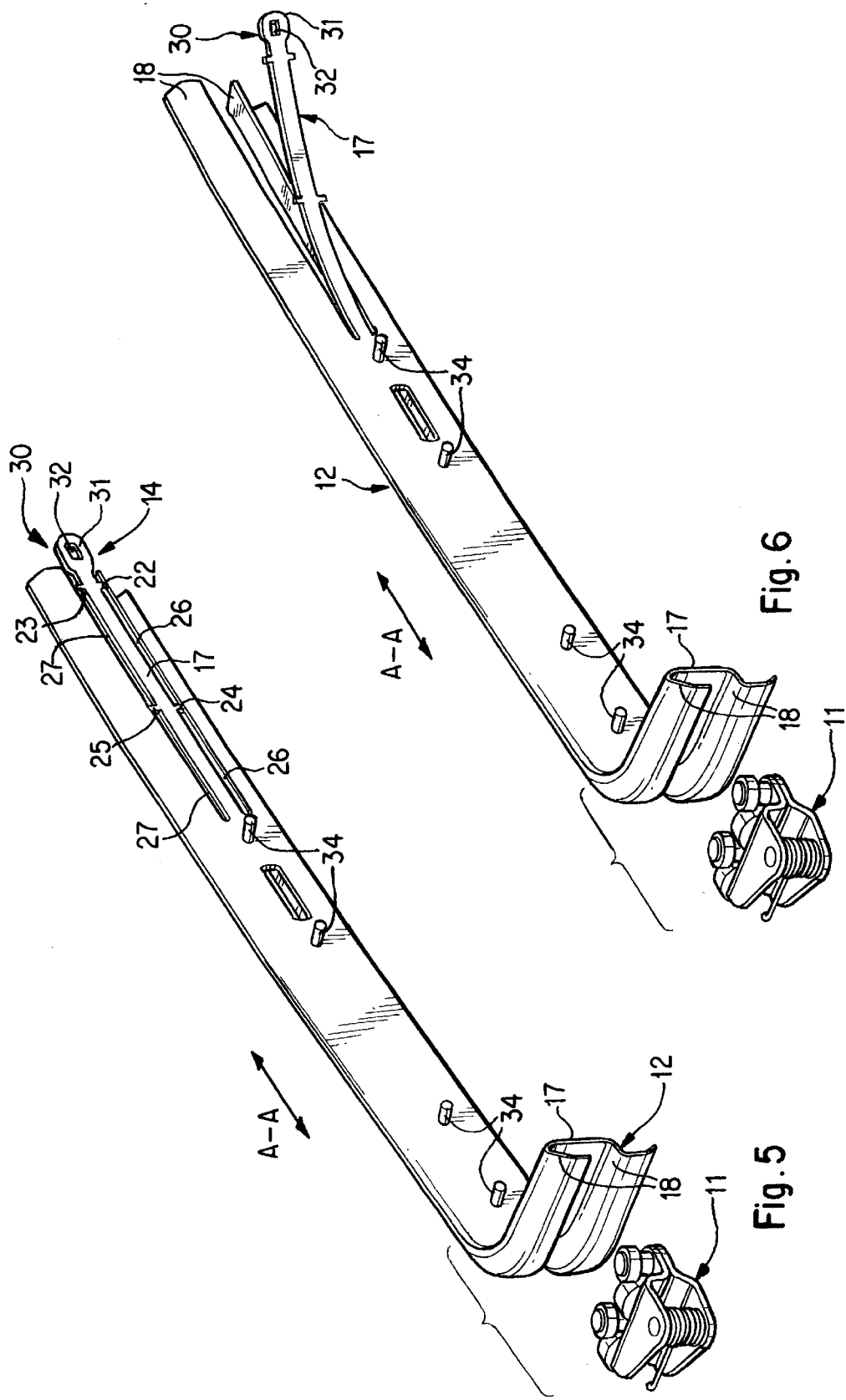

SLIDING DOOR FOR A MOTOR VEHICLE

BACKGROUND AND SUMMARY OF INVENTION

This application claims the priority of German Patent Document No. 100 45 589.1, Sep. 15, 2000, the disclosure of which is expressly incorporated by reference herein.

The invention relates to a sliding door for a motor vehicle which is arranged in use on a side wall of a body of the motor vehicle and interacts with a guide rail mounted on the side wall of the vehicle body by way of a running device, a safety device being provided for aiding in opening of the sliding door after an accident-caused deformation of the vehicle body.

Sliding doors on motor vehicles require relatively little space for the opening movement because, during the opening, they are moved at a relatively short distance from the corresponding vehicle body walls. This simplifies not only the parking but also the loading and unloading of the motor vehicles equipped with such doors. However, it is important for safety reasons that the respective sliding door can also be opened largely without any problem after an accident-caused vehicle body deformation so that access to the passenger and cargo space of the motor vehicle is ensured.

A sliding door for a passenger car is discussed in German Patent Document DE-PS 1 780 577 (corresponding U.S. Pat. No. 3,605,338) which is equipped with swivelling levers and slide rails. This sliding door is taken into account according to the description of the state of the art of German Patent Document DE 34 14 890 A1 (corresponding U.S. Pat. No. 4,703,585). In this case, reference is made to the safety factor; specifically, that a door of this construction can be opened rapidly and without any problem after an accident. The technical solution of the vehicle door according to the above-mentioned German Patent Document DE 34 14 890 A1 is characterized in that it basically operates as a sliding door but, under special circumstances, for example, after an accident, it operates as a swivelling door. For this purpose, particularly sophisticated additional constructive measures are required which promote the endeavor to represent simple weight-reducing and clear sliding door concepts.

It is therefore an object of the invention to provide a sliding door for a motor vehicle which, while it has a good opening and closing function, can also easily be opened after a deformation of the body of the motor vehicle caused, for example, by an accident.

According to the invention, this object is achieved by providing a sliding door for a motor vehicle which is arranged in use on a side wall of a body of the motor vehicle and interacts with a guide rail mounted on the side wall of the vehicle body, by way of a running device, a safety device being provided for aiding in opening of the sliding door after an accident-caused deformation of the vehicle body, wherein the safety device is constructed such that, after a deformation affecting the side wall of the vehicle body, a movement of the running device in the guide rail can be implemented for opening the sliding door.

Advantageous further features of preferred embodiments of the invention are described herein and in the claims.

Important advantages achieved by means of the invention are that the sliding door, on the one hand, because of the running device and the guide rail, can be opened and closed in an appropriate manner with respect to its function and, on the other hand, because of the safety device, can also be opened in a targeted manner if the body of the motor vehicle, for example, because of an accident, is deformed specifically in the area of the guide rail. The safety device is preferably formed by a fastening section and a guiding section of the guide rail between which a break-off device is formed which can be provided in a simple manner. This break-off device can be represented by break-off webs which connect the fastening section with the guiding section. For forming these break-off webs, slot breakthroughs, which extend in the longitudinal direction of the guide rail, are suitable between the fastening section and the guiding section. Finally, the endeavored function of the safety device will be achieved according to certain preferred embodiments, particularly if it extends only along a partial range of the overall length of the guide rail.

Other objects, advantages and novel features of the present invention will become apparent from the following detailed description of the invention when considered in conjunction with the accompanying drawings.

BRIEF DESCRIPTION OF DRAWINGS

FIG. 2 is an enlarged partial lateral view of the motor vehicle according to FIG. 1 with a guide rail of the sliding door;

FIG. 3 is an enlarged sectional view according to Line III—III of FIG. 2;

FIG. 4 is a view corresponding to FIG. 3 of another embodiment;

FIG. 5 is an enlarged diagonal view of an interior section of the guide rail of the sliding door according to FIG. 1; and FIG. 6 is a view corresponding to FIG. 5.

Figure 1:
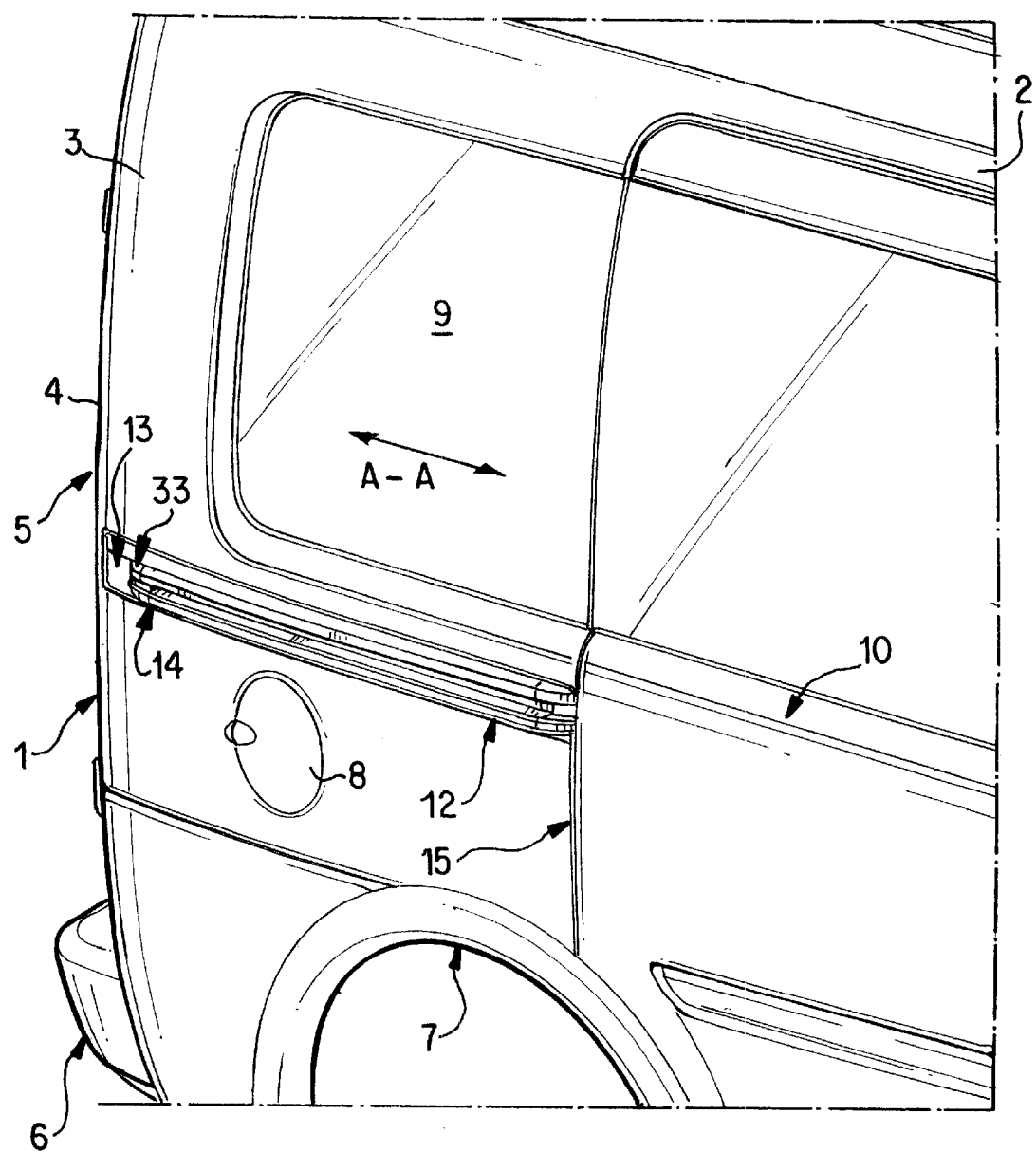
FIG. 1 is a diagonal frontal view of a partial side wall of a motor vehicle with a sliding door constructed according to a preferred embodiment of the invention.

DETAILED DESCRIPTION OF THE DRAWINGS.

A motor vehicle 1 comprises a vehicle body 2 with a side wall 3 which is bounded by a rearward upright end area 5 constructed as a rear wall 4 A bumper 6 leads away from the rear wall 4, extends along the width of the motor vehicle 1 and absorbs impact forces in a defined manner. The side wall 3 has a wheel opening 7 for a rear wheel—the latter is not shown, a filler inlet compartment lid 8, a side window 9 and a sliding door 10.

By means of a running device 11, the sliding door 10 interacts with a guide rail 12 which is aligned approximately horizontally and extends on the exterior side 13 of the side wall 3. So that, after a deformation of the side wall 3 which is caused, for example, by accident damage and is introduced by way of the rear wall 4, the sliding door 10 can be opened without any problem, a safety device 14 is provided which is constructed such that a movement of the running device 11 can be implemented after at least a local deformation of the side wall 3 in the area of the guide rail 12.

The safety device 14 is provided on the guide rail 12 which, on the one hand, extends approximately at a right angle around the upright door opening wall 15 and is provided with an end piece away from there or adjacent to the rear wall 4. For receiving the running device 11, the guide rail 12 is provided with a corresponding profiling and a defined section modulus design, the guide rail 12 having a fastening section 17 and a guiding section 18. The fastening section 17 is constructed in the manner of a plate and is directly connected to the side wall 3 and fastened to the latter. The guiding section extends on both sides 19, 20 of this fastening section 17 and can be separated from the fastening section. For this purpose, a break-off device 21—FIG. 2—is provided which is worked in between the fastening section 17 and the guiding section 18. The break-off device 21 has several break-off webs 22, 23 and 24, 25 which are arranged at a distance from one another, extend transversely to the longitudinal direction A—A—corresponds to the longitudinal direction of the vehicle—of the guide rail 11 and extend between the fastening section 17 and the guiding section 18. The break-off webs 22, 23 and 24, 25 are formed by slot breakthroughs 26, 27 which are aligned in the above-mentioned longitudinal direction A—A and are arranged parallel to one another. However, it is also contemplated according to other preferred embodiments to replace the break-off device 21 by notches 28, 29—FIG. 4—instead of using the slot breakthroughs 26, 27.

The length Ls of the break-off device 21 extends only along a partial range of the overall length Lg of the guide rail 11, the break-off device 21 or a free end 30 extending away from the door opening wall 15; in other words, the free end 30 is arranged adjacent to the end area 5. The free end 30 of the break-off device 21 is constructed as a tongue-type lengthening 31 of the fastening section 17 which projects beyond the guide rail 12 and which is provided with an opening 32, a closing part 33 of the guide rail 12 covering the lengthening 31. This opening 32 is used for receiving a fastening screw, by means of which the fastening section 17 is held in position on the side wall 3. Furthermore, the holding of the guide rail 12 takes place by means of several fastening devices 34. For aiding the breaking function, the break-off webs 22, 23 are arranged at a distance as from the free end 30 of the break-off device 21.

After a defined accident-caused impact on the rear wall 4 which results in the deformation of the side wall 3, the fastening section 17 is separated from the guiding section 18 that is, it takes up a position caused by the deformation of the side wall—FIG. 6—whereas, the guiding section 18—also because of its inherent stability maintains a position which permits a targeted opening of the sliding door 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Sliding door for a motor vehicle which is arranged in use on a side wall of a body of the motor vehicle and interacts with a guide rail mounted on the side wall of the vehicle body, by way of a running device, a safety device being provided for aiding in opening of the sliding door after an accident-caused deformation of the vehicle body, wherein the safety device is constructed such that, after a deformation affecting the side wall of the vehicle body, running device movement in the guide rail is permitted for opening the sliding door.

2. Sliding door according to claim 1, wherein the safety device is provided on the guide rail which has a fastening section constructed in the manner of a plate and interacting with the side wall and has a guiding section for the running device which can be separated from the fastening section.

3. Sliding door according to claim 2, wherein the safety device includes a break-off device provided between the fastening section and the guiding section.

4. Sliding door according to claim 3, wherein the break-off device has several break-off webs which are arranged at a distance from one another and are arranged between the fastening section and the guiding section.

5. Sliding door according to claim 4, wherein the break-off webs are formed by slot breakthroughs between the fastening section and the guiding section.

6. Sliding door according to claim 3, wherein the break-off device is formed by notches between the fastening section and the guiding section.

7. Sliding door according to claim 31 wherein the break-off device extends only along a partial range of an overall length of the guide rail.

8. Sliding door according to claim 6, wherein the break-off device extends at a distance from a door opening wall of the sliding door.

9. Sliding door according to claim 7, wherein a free end of the break-off device is arranged adjacent to an end area of the vehicle body.

10. Sliding door according to claim 9, wherein the fastening section is provided with a tongue-type lengthening extending beyond the guide rail adjacent to the free end, the fastening section being connected with the side wall in the area of the lengthening.

11. Sliding door according to claim 9, wherein the break-off webs are arranged at a distance from a free end of the break-off device.

12. A vehicle body assembly comprising:

a vehicle side wall, and a door guide rail fixed to the side wall and operable in use to guide opening and closing movements of a vehicle sliding door with a running device guided in said door guide rail, wherein said door guide rail is configured to permit movement of said running device in said guide rail after collision induced deformation of the vehicle side wall at locations where said door guide rail is fixed to said side wall, wherein said guide rail includes a fastening plate section adapted to abut with and be directly attached to the vehicle side wall and a guiding section configured to guide the running device, and wherein said guide rail includes break away connections between the fastening plate section and the guiding section along a portion of the length of the guide rail.

13. A vehicle body assembly according to claim 12, wherein the fastening plate section includes a tongue at one end with a fastening opening accommodating a fastening member to fix the tongue end to said side wall.

14. A vehicle body assembly according to claim 13, wherein said break away connections are at the same end of the guide rail as said tongue.

15. A vehicle body assembly according to claim 14, wherein said tongue faces toward a rear end of said side wall with respect to a forward driving direction of the vehicles.

16. A vehicle body assembly according to claim 15, comprising a closing part operable to cover the rear end of the tongue in an area where the tongue protrudes beyond the guiding section of the guide rail.

17. A vehicle body assembly according to claim 15, wherein the break away connections extend over a rearward section of the guide rail, said rearward section being less than half as long as said guide rail.

* * * * *